United States Patent
Yokokawa

(10) Patent No.: US 9,969,397 B2
(45) Date of Patent: May 15, 2018

(54) CONTROL DEVICE FOR VEHICLE

(71) Applicant: TOYOTA JIDOSHA KABUSHIKI KAISHA, Toyota-shi (JP)

(72) Inventor: Takahiro Yokokawa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 68 days.

(21) Appl. No.: 15/104,847

(22) PCT Filed: Dec. 15, 2014

(86) PCT No.: PCT/IB2014/002781
§ 371 (c)(1),
(2) Date: Jun. 15, 2016

(87) PCT Pub. No.: WO2015/092518
PCT Pub. Date: Jun. 25, 2015

(65) Prior Publication Data
US 2017/0028990 A1    Feb. 2, 2017

(30) Foreign Application Priority Data

Dec. 17, 2013 (JP) ................................ 2013-260481

(51) Int. Cl.
*B60W 30/18* (2012.01)
*B60W 10/02* (2006.01)
(Continued)

(52) U.S. Cl.
CPC ...... *B60W 30/18072* (2013.01); *B60W 10/02* (2013.01); *B60W 10/023* (2013.01);
(Continued)

(58) Field of Classification Search
CPC ......... B60W 30/18072; B60W 10/023; B60W 10/02; B60W 10/06; B60W 10/11;
(Continued)

(56) References Cited

U.S. PATENT DOCUMENTS

| 4,473,882 A | 9/1984 | Suzuki et al. |
| 2011/0136622 A1* | 6/2011 | Enoki .................. B60W 10/02 477/83 |

(Continued)

FOREIGN PATENT DOCUMENTS

| CN | 102729998 A | 10/2012 |
| JP | 57-58520 A | 4/1982 |

(Continued)

OTHER PUBLICATIONS

International Search Report dated May 7, 2015 in PCT/IB2014/002781 Filed Dec. 15, 2014.

*Primary Examiner* — David J Hlavka
(74) *Attorney, Agent, or Firm* — Oblon, McClelland, Maier & Neustadt, L.L.P.

(57) ABSTRACT

A clutch disposed between an engine and an automatic transmission and including a first engagement element connected to the engine and a second engagement element connected to the automatic transmission. The electronic control unit is configured to, when a predetermined condition is satisfied, execute predetermined control in which the engine is stopped, the clutch is disengaged, and the vehicle is caused to travel. The electronic control unit is configured to start the engine when the predetermined condition is not satisfied during execution of the predetermined control, and execute downshift of the automatic transmission such that the rotational speed of the second engagement element becomes equal to or higher than a predetermined rotational speed when the predetermined condition is not satisfied during the execution of the predetermined control and the rotational speed of the second engagement element is lower than the predetermined rotational speed, and then engage the clutch.

7 Claims, 6 Drawing Sheets

(51) Int. Cl.
*B60W 10/06* (2006.01)
*B60W 10/11* (2012.01)
*B60W 30/20* (2006.01)

(52) U.S. Cl.
CPC ............ *B60W 10/06* (2013.01); *B60W 10/11* (2013.01); *B60W 2030/1809* (2013.01); *B60W 2030/203* (2013.01); *B60W 2510/0638* (2013.01); *B60W 2520/10* (2013.01); *B60W 2540/10* (2013.01); *B60W 2710/021* (2013.01); *B60W 2710/025* (2013.01); *B60W 2710/0644* (2013.01); *B60W 2710/0666* (2013.01); *B60W 2710/1005* (2013.01); *B60W 2710/1011* (2013.01)

(58) Field of Classification Search
CPC ..... B60W 2710/021; B60W 2710/025; B60W 2540/10; B60W 2030/203; B60W 2510/0638; B60W 2030/1809; B60W 2710/0644; B60W 2710/0666; B60W 2710/1055; B60W 2710/1011; B60W 2520/10

See application file for complete search history.

(56) References Cited

U.S. PATENT DOCUMENTS

| | | | |
|---|---|---|---|
| 2012/0265427 A1 | 10/2012 | Petridis et al. | |
| 2013/0296125 A1* | 11/2013 | Gibson | B60W 20/10 477/5 |
| 2013/0297123 A1* | 11/2013 | Gibson | B60W 20/1084 701/22 |
| 2013/0297161 A1* | 11/2013 | Gibson | B60W 20/00 701/54 |
| 2014/0172217 A1 | 6/2014 | Miyazaki et al. | |

FOREIGN PATENT DOCUMENTS

| | | |
|---|---|---|
| JP | 2010-53707 A | 3/2010 |
| JP | 2012-47148 A | 3/2012 |
| WO | 2013/027288 A1 | 2/2013 |

* cited by examiner

CONTROL DEVICE FOR VEHICLE

BACKGROUND OF THE INVENTION

1. Field of the Invention

The invention relates to a control device for a vehicle.

2. Description of Related Art

Conventionally, there is a control device for a vehicle that stops a rotation of an engine, disengages a clutch, and causes the vehicle to travel. For example, Japanese Patent Application Publication No. 2012-047148 (JP 2012-047148 A) discloses the technology of the control device for the vehicle in which, when a vehicle speed V of the vehicle is in a vehicle speed range determined by a lower limit vehicle speed V0 and an upper limit vehicle speed V1, in the case where the vehicle speed V is equal to or higher than the vehicle speed V0, the rotation of the engine is stopped by fuel cut, the clutch is disengaged, and the vehicle is caused to run by inertia. In addition, JP 2012-047148 A also discloses the technology of the control device for the vehicle in which, when the vehicle speed V becomes lower than the vehicle speed V0, the engine is started by fuel supply, the clutch is engaged, and the vehicle is accelerated.

SUMMARY OF THE INVENTION

When the engine is restarted and the clutch is engaged during the traveling of the vehicle, there is a possibility that a shock occurs. For example, when the clutch is engaged during an increase of an engine rotational speed by the restart of the engine, a relatively large starting torque is transmitted via the clutch. Therefore, there is a possibility that the shock occurs.

An object of the invention provides the control device for the vehicle capable of preventing the shock when the engine is restarted and the clutch is engaged during the traveling of the vehicle.

An aspect of the invention is a control device for a vehicle. The vehicle includes an engine, an automatic transmission, and a clutch disposed between the engine and the automatic transmission, and the clutch includes a first engagement element connected to the engine and a second engagement element connected to the automatic transmission. The control device includes an electronic control unit. The electronic control unit is configured to, when a predetermined condition is satisfied, execute predetermined control in which the engine is stopped, the clutch is disengaged, and the vehicle is caused to travel. The electronic control unit is configured to start the engine when the predetermined condition is not satisfied during execution of the predetermined control. The electronic control unit is configured to execute downshift of the automatic transmission such that a rotational speed of the second engagement element becomes equal to or higher than a predetermined rotational speed when the predetermined condition is not satisfied during the execution of the predetermined control and the rotational speed of the second engagement element is lower than the predetermined rotational speed, and then engage the clutch.

In the aspect described above, the predetermined rotational speed may be a maximum value of a rotational speed of the first engagement element when a rotational speed of the engine increases at the time of start of the engine.

In the aspect described above, the electronic control unit may be configured to set, as an operating point of the engine after the downshift is executed, an operating point higher in torque than an operating point on a constant-power line determined from an operating point of the engine before the downshift is executed.

In the aspect described above, the electronic control unit may be configured to determine whether an upshift is executed based on a gear shift line after the downshift is executed, and the gear shift line is offset such that an accelerator depression amount of the gear shift line after the downshift is executed becomes larger than an accelerator depression amount of a gear shift line before the downshift is executed.

In the aspect described above, the electronic control unit may be configured to engage the clutch after the rotational speed of the engine or the rotational speed of the first engagement element starts to decrease after reaching the maximum value at the time of start of the engine when a vehicle speed is lower than the predetermined vehicle speed.

The vehicle control device according to the invention is the control device for the vehicle. The vehicle includes the engine, the automatic transmission, and the clutch disposed between the engine and the automatic transmission, and the clutch includes the first engagement element connected to the engine and the second engagement element connected to the automatic transmission. The control device includes the electronic control unit. The electronic control unit is configured to execute the predetermined control in which the engine is stopped, the clutch is disengaged, and the vehicle is caused to travel when the predetermined condition is satisfied. The electronic control unit is configured to start the engine when the predetermined condition is not satisfied during execution of the predetermined control. The electronic control unit is configured to execute the downshift of the automatic transmission such that the rotational speed of the second engagement element becomes equal to or higher than the predetermined rotational speed when the predetermined condition is not satisfied during the execution of the predetermined control and the rotational speed of the second engagement element is lower than the predetermined rotational speed, and then engage the clutch. According to the aspect of the invention, the clutch is engaged after the rotational speed of the second engagement element is increased. Therefore, the effect is achieved that it is possible to prevent the shock when the engine is started and the clutch is engaged.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinbelow, vehicle control devices according to embodiments of the invention will be described in detail with reference to the drawings. Note that the invention is not limited to the embodiments. In addition, components in the embodiments described below include components that can be easily conceived by a person skilled in the art or substantially the same components.

Figure 1:
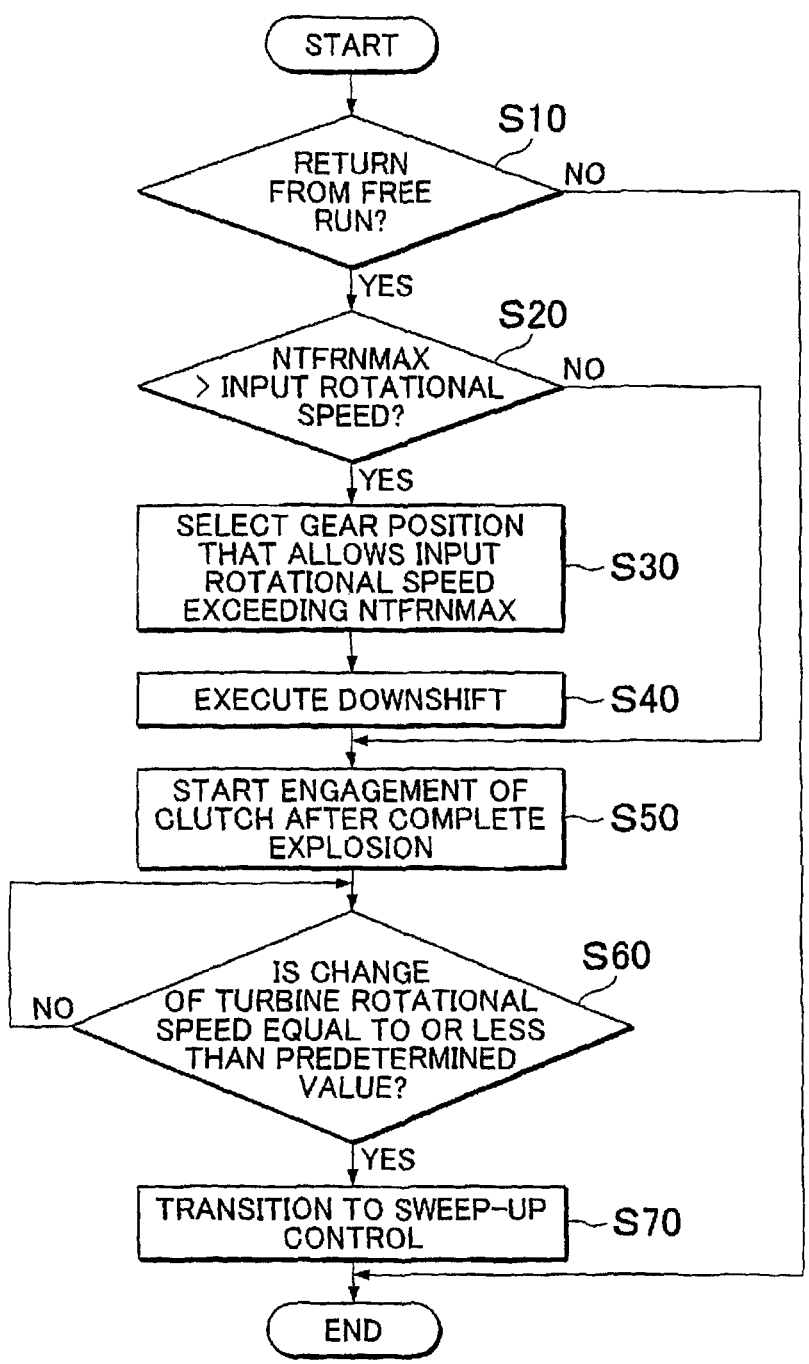
FIG. 1 is a flowchart showing the operation of a vehicle control device according to a first embodiment.
Figure 2:
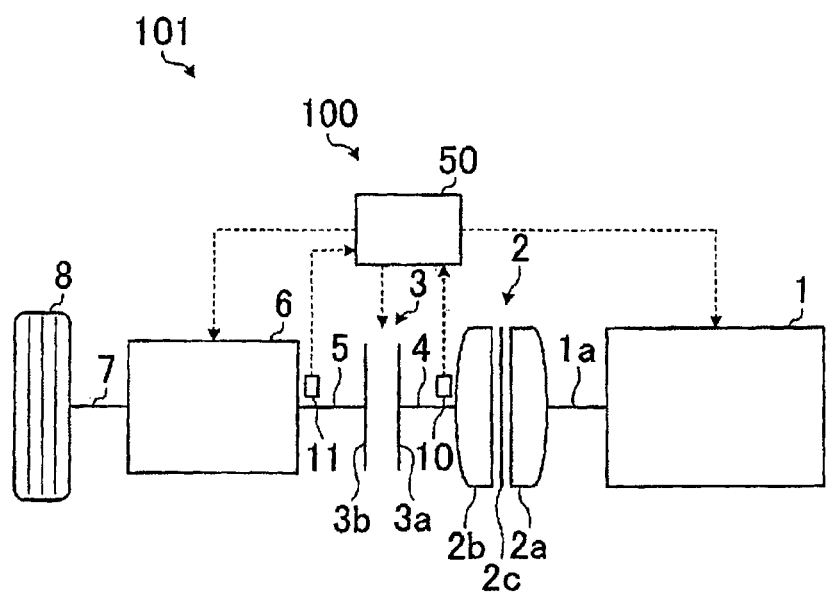
FIG. 2 is a view showing the schematic configuration of a vehicle according to the first embodiment.
Figure 3:
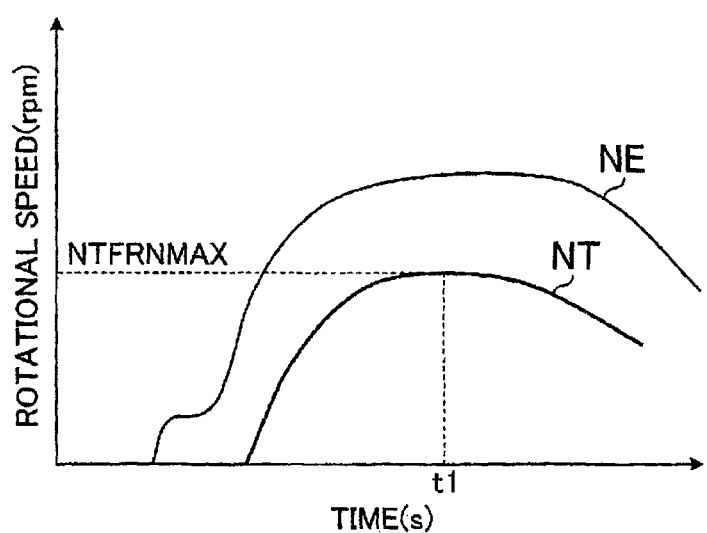
FIG. 3 is an explanatory view of the maximum value of a turbine rotational speed.
Figure 4:
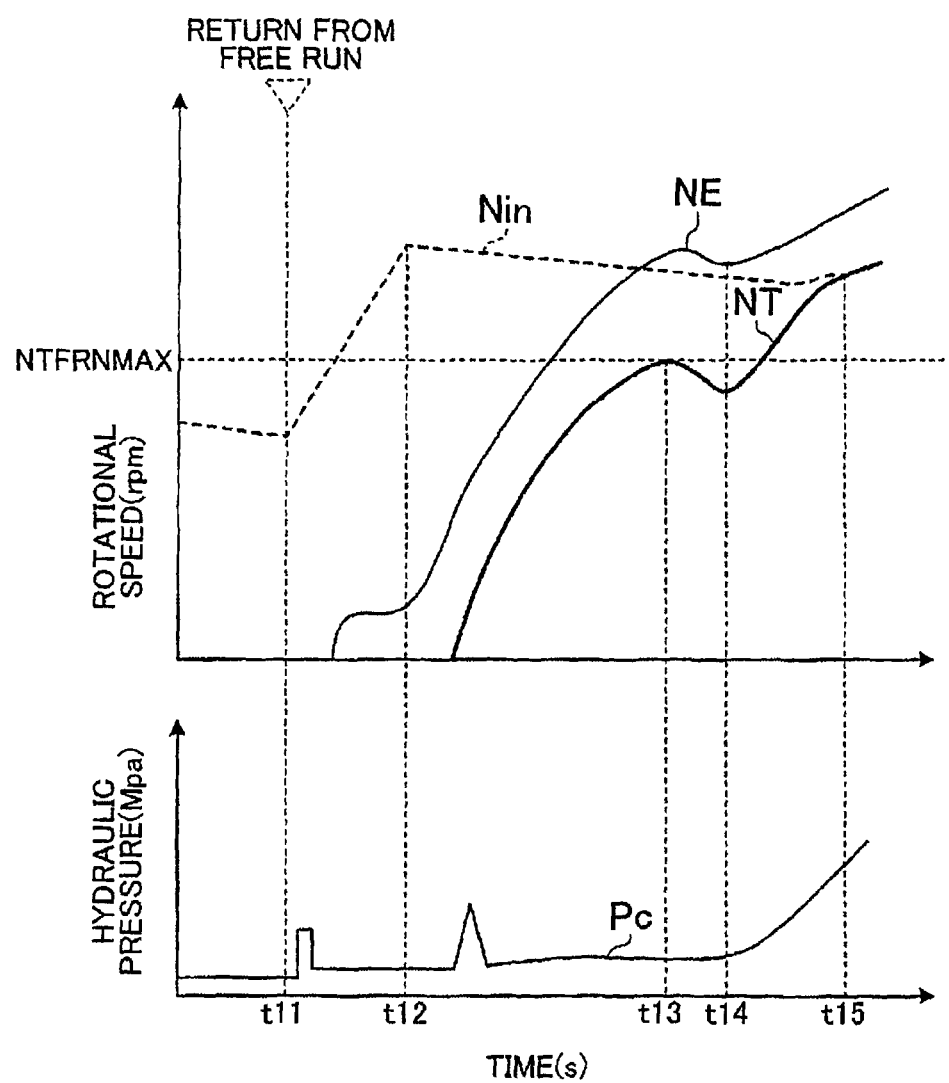
FIG. 4 is a time chart related to the operation of the vehicle control device of the first embodiment.

With reference to FIGS. 1 to 4, a first embodiment will be described. The present embodiment relates to the vehicle control device. FIG. 1 is a flowchart showing the operation of the vehicle control device according to the first embodiment of the invention, FIG. 2 is a view showing the schematic configuration of the vehicle according to the first embodiment, FIG. 3 is an explanatory view of the maximum value of a turbine rotational speed, and FIG. 4 is a time chart related to the operation of the vehicle control device of the first embodiment.

As shown in FIG. 2, a vehicle 101 according to the present embodiment includes a vehicle control device 100. A vehicle system of the present embodiment includes an engine 1, an automatic transmission 6, a clutch 3, and a control section 50.

The engine 1 converts combustion energy of fuel into rotary motion of an output shaft 1a, and outputs the rotary motion. A torque converter 2 is connected to the output shaft 1a. The torque converter 2 includes a pump impeller 2a, a turbine runner 2b, and a stator 2c. The torque converter 2 transmits a torque by fluid transmission between the pump impeller 2a and the turbine runner 2b. The stator 2c amplifies the torque inputted from the pump impeller 2a and outputs the amplified torque to the turbine runner 2b. The turbine runner 2b is connected to an output shaft 4. Note that the torque converter 2 may have a lock-up clutch that connects and disconnects the output shaft 1a of the engine 1 to and from the output shaft 4.

The clutch 3 is disposed between the engine 1 and the automatic transmission 6. The clutch 3 has a first engagement element 3a and a second engagement element 3b. Each of the first engagement element 3a and the second engagement element 3b is a frictional engagement element. The clutch 3 transmits the torque with the frictional engagement of the first engagement element 3a and the second engagement element 3b. The first engagement element 3a is connected to the output shaft 4 of the torque converter 2. That is, the first engagement element 3a is connected to the engine 1 via the torque converter 2. The second engagement element 3b is connected to an input shaft 5 of the automatic transmission 6.

The clutch 3 according to the present embodiment is a hydraulic clutch device of which engagement and disengagement is controlled using hydraulic pressure. The first engagement element 3a and the second engagement element 3b are disengaged from each other and the torque is not transmitted between them in the case where the hydraulic pressure supplied to the clutch 3 is low or the case where the hydraulic pressure is not supplied to the clutch 3. On the other hand, the first engagement element 3a and the second engagement element 3b are frictionally engaged with each other and the torque is transmitted between them when the hydraulic pressure supplied to the clutch 3 becomes equal to or larger than an engagement start hydraulic pressure. The clutch 3 is configured such that slip control in which the first engagement element 3a and the second engagement element 3b are caused to rotate relative to each other is allowed. In the slip control, the degree of engagement of the first engagement element 3a and the second engagement element 3b is changed using the supplied hydraulic pressure and a slip amount can be thereby controlled. In addition, the first engagement element 3a and the second engagement element 3b are brought into a complete engagement state in which the first engagement element 3a and the second engagement element 3b rotate integrally when the supplied hydraulic pressure becomes equal to or larger than a specific hydraulic pressure.

The automatic transmission 6 adjusts a speed ratio as a ratio between the rotational speed of the input shaft 5 and the rotational speed of an output shaft 7. The automatic transmission 6 according to the present embodiment is a stepped transmission. The automatic transmission 6 has the function of selectively switching between a plurality of predetermined speed positions. The output shaft 7 of the automatic transmission 6 is connected to a driving wheel 8 via a differential mechanism or the like.

The control section 50 is, e.g., an electronic control unit (ECU) having a computer. The control section 50 controls the engine 1, the clutch 3, and the automatic transmission 6. The control section 50 may further have the function of controlling the lock-up clutch of the torque converter 2. The control section 50 has, for example, an engine control section that controls the fuel supply amount and supply timing, the opening of a throttle valve, ignition timing, and opening/closing timing of intake and exhaust valves of the engine 1. In addition, the control section has, for example, a clutch control section that controls the hydraulic pressure supplied to the clutch 3 (hereinafter referred to as "engagement hydraulic pressure"). Further, the control section 50 has a gear shift control section that issues, e.g., a gear shift instruction to the automatic transmission 6.

A signal indicative of the vehicle speed of the vehicle 101, a signet indicative of an accelerator depression amount as the depression amount of an accelerator pedal, and a signal indicative of an accelerator-off state in which the accelerator pedal is not depressed are inputted to the control section 50. In addition, the vehicle 101 is provided with a turbine rotational speed sensor 10 that detects the rotational speed of the output shaft 4, and an input rotational speed sensor 11 that detects the rotational speed of the input shaft 5. A signal indicative of the rotational speed detected by the turbine rotational speed sensor 10 and a signal indicative of the rotational speed detected by the input rotational speed sensor 11 are inputted to the control section 50.

The control section 50 has the function of executing predetermined control. The predetermined control is control in which the engine 1 is stopped, the clutch 3 is disengaged, and the vehicle 101 is caused to travel. The control section 50 may stop fuel supply to the engine 1 after disengaging the clutch 3. The control section 50 may execute the disengagement of the clutch 3 and the stop of the fuel supply to the engine 1 simultaneously. The control section 50 may disengage the clutch 3 after stopping the fuel supply to the engine 1. In the predetermined control, the vehicle 101 coasts. According to the predetermined control, by disconnecting the engine 1 from the driving wheel 8, traveling resistance is reduced as compared with the case where the vehicle travels with the clutch 3 being engaged. In addition, fuel consumption is suppressed by stopping the engine 1. Consequently, it is possible to achieve a reduction in the fuel consumption of the vehicle 101 by appropriately executing the predetermined control. In the present specification, the predetermined control is also described as "free run". The control section 50 executes the predetermined control on condition that, e.g., the vehicle is brought into an accelerator-off state during traveling.

In addition, the control section 50 performs a return operation from the predetermined control when a return condition from the predetermined control is established (the predetermined condition is not satisfied) during the execution of the predetermined control. In the return operation, the control section 50 restarts the engine 1 and engages the clutch 3. When the clutch 3 is engaged, the torque of the engine 1 is transmitted to the driving wheel 8 via the clutch 3, and the traveling state of the vehicle 101 is returned to a traveling state in which the engine 1 is used as a power source.

Figure 8:
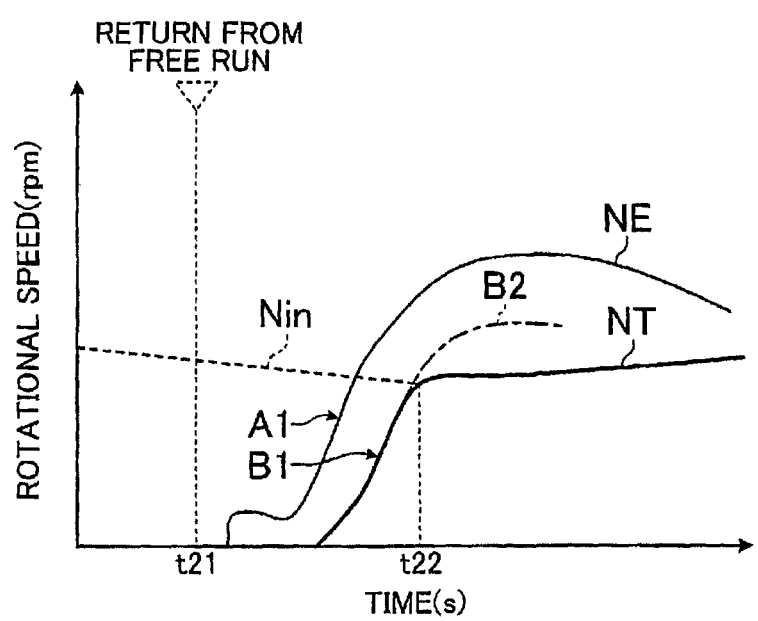
FIG. 8 is a view for explaining a shock when a clutch is engaged.

Herein, in the return operation, there are cases where a shock occurs when the clutch 3 is engaged. For example, during the restart of the engine 1, as will described with reference to FIG. 8, there is a possibility that the clutch 3 is engaged during the increase of the rotational speed of the engine 1 (hereinafter referred to as an "engine rotational speed NE"). FIG. 8 is a view for explaining the shock when the clutch is engaged. In FIG. 8, the horizontal axis indicates time, and the vertical axis indicates the rotational speed [rpm]. In FIG. 8, the engine rotational speed NE and a turbine rotational speed NT as the rotational speed of the turbine runner 2b, and an input rotational speed Nin as the rotational speed of the input shaft 5 of the automatic transmission 6 are shown as the rotational speeds. The turbine rotational speed NT is also the rotational speed of the first engagement element 3a of the clutch 3. The input rotational speed Nin is also the rotational speed of the second engagement element 3b of the clutch 3.

In an example shown in FIG. 8, a return request from the free run is made at time t21. The return request is generated, e.g., in the case where the accelerator pedal is depressed. In the example shown in FIG. 8, the input rotational speed Nin when the return request is made is relatively low. With the return request, the restart of the engine 1 is started, and the engine rotational speed NE increases as indicated by a reference mark A1. The turbine rotational speed NT increases in response to the increase of the engine rotational speed NE as indicated by a reference mark B1. The engine 1 and the turbine runner 2b transmit the torque via a working fluid, and hence the turbine rotational speed NT hovers at a speed lower than the engine rotational speed NE.

When the turbine rotational speed NT increases and becomes substantially equal to the input rotational speed Nin, the clutch 3 is engaged. With this, the turbine rotational speed NT and the input rotational speed Nin hover at the same rotational speed. At time t22 when the clutch 3 is completely engaged, the turbine rotational speed NT is increasing. When the clutch 3 is kept disengaged, as indicated by a reference mark B2, the turbine rotational speed NT further increases in response to the engine rotational speed NE. That is, by engaging the clutch 3, the rotation of the turbine runner 2b is damped such that the turbine rotational speed NT that is about to pick up is kept at the rotational speed of the input rotational speed Nin. In other words, kinetic energy of the turbine runner 2b is converted into heat by the slip of the clutch 3.

When the engine 1 is started, an air-fuel ratio is richer than during a normal operation, and the engine 1 generates a large starting torque. With this, the engine rotational speed NE and the turbine rotational speed NT pick up. Note that the pickup means that the engine rotational speed NE increases to a rotational speed higher than an idle speed and that the engine rotational speed NE increases with a large acceleration. When the clutch 3 is engaged in the middle of the pickup, a large starting torque is inputted to the vehicle 101, and hence the shock occurs. In addition, by momentarily eliminating a large difference in the rotation between the first engagement element 3a and the second engagement element 3b to thereby synchronize their respective rotational speeds, the amount of heat generation of the clutch 3 per unit time is increased. From the viewpoint of improving the durability of the clutch 3, it is preferable to be able to reduce the amount of heat generation of the clutch 3 per unit time.

The vehicle control device 100 of the present embodiment executes downshift of the automatic transmission 6 and increases the input rotational speed Nin in the case where the input rotational speed Nin when the return request is generated is low. The vehicle control device 100 engages the clutch 3 after the input rotational speed Nin increases. With this, at the time of the return from the predetermined control, the occurrence of the shock when the clutch 3 is engaged is prevented.

More specifically, in the case where the rotational speed of the second engagement element 3b (the input rotational speed Nin) is lower than a predetermined rotational speed (see NTFRNMAX in FIG. 4) at the time of the return form the predetermined control by restarting the engine 1, the control section 50 executes the downshift of the automatic transmission 6 to thereby increase the rotational speed of the second engagement element 3b to the rotational speed equal to or higher than the predetermined rotational speed NTFRNMAX, and then engages the clutch 3. Herein, the predetermined rotational speed NTFRNMAX is the maximum value of the rotational speed of the first engagement element 3a (the turbine rotational speed NT) when the rotational speed of the engine 1 increases at the time of start of the engine 1.

With this, the vehicle control device 100 of the present embodiment can engage the clutch 3 after the turbine rotational speed NT increases to the peak rotational speed at the time of start of the engine. Therefore, it is possible to engage the clutch 3 in a state in which the torque control of the engine 1 is relatively easy, and it becomes possible to prevent the occurrence of the shock when the clutch 3 is engaged.

The predetermined rotational speed NTFRNMAX may also be determined as the maximum value of the turbine rotational speed NT that picks up when the engine 1 is empirically started in advance in a state in which the clutch 3 is disengaged. As shown in FIG. 3, in the case where the clutch 3 is disengaged and the engine 1 is started, the turbine rotational speed NT increases together with the engine rotational speed NE. The turbine rotational speed NT increases to the peak value (the maximum value) at time t1, and then gradually decreases. The peak value at this point may be appropriately stored as the predetermined rotational speed NTFRNMAX in the control section 50.

Instead of the method of determining the predetermined rotational speed NTFRNMAX empirically, the predetermined rotational speed NTFRNMAX may also be determined during the traveling of the vehicle. For example, in the case where the return request from the predetermined control is made when the input rotational speed Nin is high, it is considered that the turbine rotational speed NT increases to the peak value before the clutch 3 is engaged. In such a case, the control section 50 may acquire the maximum value as the predetermined rotational speed NTFRNMAX based on the transition of the turbine rotational speed NT before the clutch 3 is engaged. That is, the predetermined rotational speed NTFRNMAX may be appropriately updated by learning control.

With reference to FIGS. 1 and 4, the operation of the vehicle control device 100 of the first embodiment will be described. A time chart shown in FIG. 4 indicates an engagement hydraulic pressure Pc of the clutch 3 in addition to the engine rotational speed NE, the turbine rotational speed NT, and the input rotational speed Nin. The flowchart in FIG. 1 is repeatedly executed at predetermined intervals after the predetermined control is started.

In step S10, the control section 50 determines whether or not the return request from the free run is generated first. For example, when accelerator off is switched to accelerator on, the control section 50 performs affirmative determination in step S10. As the result of the determination in step S10, in the case where it is determined that the return request from the free run is generated (step S10-Y), the control flow proceeds to step S20 and, in the case where it is determined that the return request therefrom is not generated (step S10-N), the present control flow is ended. In FIG. 4, the return request from the free run is generated at time t11.

In step S20, the control section 50 determines whether or not the input rotational speed Nin is lower than the predetermined rotational speed NTFRNMAX. The control section 50 determines whether or not the input rotational speed Nin acquired from the input rotational speed sensor 11 is lower than the pre-stored predetermined rotational speed NTFRNMAX. As the result of the determination in step S20, in the case where it is determined that the input rotational speed Nin is lower than the predetermined rotational speed NTFRNMAX (step S20-Y), the control flow proceeds to step S30 and, in the case where the input rotational speed NM is not lower than the predetermined rotational speed NTFRNMAX (step S20-N), the control flow proceeds to step S50.

In step S30, the control section 50 selects a gear position that allows the input rotational speed Nin exceeding the predetermined rotational speed NTFRNMAX. The control section 50 calculates the input rotational speed Nin in the case where each of the gear positions is selected based on the current vehicle speed and the gear ratio of each gear position of the automatic transmission 6. For example, the control section 50 calculates an estimated input rotational speed Nin (k) for the ordinal number k of each gear position based on the vehicle speed and the gear ratio. In the case where the automatic transmission 6 has six gear positions from the first gear position to the sixth gear position, it is possible to calculate six estimated input rotational speeds (k) from the estimated input rotational speed Nin (1) of the first gear position to the estimated input rotational speed Nin (6) of the sixth gear position.

The control section 50 of the present embodiment selects the gear position having the smallest speed ratio from among the gear positions of which the estimated input rotational speeds (k) exceed the predetermined rotational speed NTFRNMAX, i.e., the gear position on the highest speed side as a target gear position. For example, in the case where the predetermined rotational speed NTFRNMAX is 1200 rpm, it is assumed that the estimated input rotational speed NM (4) of the fourth gear position is 1100 rpm, the estimated input rotational speed Nin (3) of the third gear position is 1250 rpm, and the estimated input rotational speed Nin (2) of the second gear position is 1450 rpm. In this case, it is preferable to select the third gear position as the target gear position. When the target gear position is selected, the control flow proceeds to step S40.

In step S40, the control section 50 executes downshift. The control section 50 instructs the automatic transmission 6 to perform the downshift to the target gear position selected in step S30. The automatic transmission 6 executes the downshift to the target gear position. In addition, the control section 50 instructs the engine 1 to restart. The control section 50 instructs the engine 1 to operate at a target operating point in the target gear position.

In FIG. 4, the downshift instruction is issued by the control section 50 at time t11, and the downshift is started. With this, the input rotational speed Nin that has been lower than the predetermined rotational speed NTFRNMAX starts to increase. In FIG. 4, the timing of start of the downshift is before the timing of start of the restart of the engine 1 (start of increase of the engine rotational speed NE). The timing thereof is not limited thereto, and the control section 50 may output the downshift instruction and the restart instruction such that the timing of start of the downshift matches the timing of start of the restart of the engine 1.

Alternatively, the control section 50 may output the downshift instruction and the restart instruction such that the timing of start of the downshift is after the timing of start of the restart of the engine 1. However, in any case, the downshift and the restart of the engine 1 may be performed such that the input rotational speed Nin exceeds the turbine rotational speed NT (the rotational speed of the first engagement element 3a) during the increase of the engine rotational speed NE.

The input rotational speed Nin is higher than the turbine rotational speed NT until time t12 when the downshift is completed. Consequently, the engagement of the downshift is prevented during the downshift operation. In addition, the input rotational speed Nin is higher than the turbine rotational speed NT until time t13 when the engine rotational speed NE and the turbine rotational speed NT reach the peak values. With this, the engagement of the clutch 3 during the increase of the turbine rotational speed at the time of start of the engine is prevented. When step S40 is executed, the control flow proceeds to step S50.

In step S50, the control section 50 starts the engagement of the clutch after complete explosion. The control section 50 determines whether or not the engine 1 is in a complete-explosion state based on, e.g., the engine rotational speed NE. Herein, the complete explosion means the transition of the engine 1 to a state in which the engine 1 continuously rotates without auxiliary power such as a starter or the like. In other words, the complete explosion denotes the transition of the engine 1 to a state in which the engine 1 is capable of self-support operation. The control section 50 determines that the engine 1 is in the complete explosion state when the engine rotational speed NE becomes equal to or higher than a rotational speed serving as the threshold value of complete explosion determination. In addition, the control section 50 may determine that the engine 1 is in the complete-explosion state when the engine rotational speed NE increases to the peak value and then decreases at the time of start of the engine 1.

When the control section 50 determines that the engine 1 is in the complete-explosion state, the control section 50 starts the engagement of the clutch 3. In FIG. 4, for example, the complete explosion determination is made when the increase of each of the turbine rotational speed NT and the engine rotational speed NE ends at time t13. After the complete explosion determination of the engine 1, the control section 50 gradually increases the engagement hydraulic pressure Pc of the clutch 3. When step S50 is executed, the control flow proceeds to step S60.

In step S60, the control section 50 determines whether or not the change of the turbine rotational speed NT is equal to or less than a predetermined value. For example, when the change amount of the turbine rotational speed NT per unit time becomes equal to or less than the predetermined value that is preset, the control section 50 performs the affirmative determination in step S60. In FIG. 4, at time t14, the engine rotational speed NE approaches the idle speed, and the change of the engine rotational speed NE is reduced. Correspondingly to this, the change amount of the turbine rotational speed NT is also reduced at time t14. In FIG. 4, it is determined that the change of the turbine rotational speed NT is equal to or less than the predetermined value at time t14. As the result of the determination in step S60, in the case where it is determined that the change of the turbine rotational speed NT is equal to or less than the predetermined value (step S60-Y), the control flow proceeds to step S70 and, in the case where it is determined that the change of the turbine rotational speed NT is more than the predetermined value (step S60-N), the determination in step S60 is repeated.

In step S70, the control section 50 performs transition to sweep-up control. The control section 50 starts the sweep-up control in which the engagement hydraulic pressure Pc of the clutch 3 is gradually increased. Concurrently with this, the control section 50 increases the engine rotational speed NE toward a target rotational speed. The target rotational speed is determined based on, e.g., the accelerator depression amount and the vehicle speed.

In FIG. 4, at time t14 when the affirmative determination is made in step S60, the input rotational speed Nin is higher than the turbine rotational speed NT. The engine rotational speed NE increases, and the engagement hydraulic pressure Pc starts to increase and the clutch 3 transmits the torque, whereby a difference between the input rotational speed Nin and the turbine rotational speed NT is gradually reduced. At time t15, the difference between the input rotational speed Nin and the turbine rotational speed NT becomes equal to or less than a predetermined value, and the clutch 3 is completely engaged. When the clutch 3 is completely engaged and the engagement hydraulic pressure Pc increases to a predetermined target hydraulic pressure at the time of the complete engagement, the control section 50 ends the sweep-up control. When step S70 is executed, the present control flow is ended.

According to the vehicle control device 100 of the present embodiment, the shock when the clutch 3 is engaged at the time of the return from the predetermined control is prevented. In addition, according to the vehicle control device 100, the amount of heat generation of the clutch 3 per unit time when the clutch 3 is engaged at the time of the return from the predetermined control is suppressed. Therefore, it is possible to improve the durability of the clutch 3. Further, according to the vehicle control device 100 of the present embodiment, the clutch 3 is engaged during the increase of the engine rotational speed NE after the complete explosion of the engine 1, and it is thereby possible to increase the speed ratio of the torque converter 2 and reduce the torque ratio of the torque converter 2. With this, the torque outputted from the turbine runner 2b is suppressed and the torque inputted to the clutch 3 is reduced so that the durability of the clutch 3 is improved.

Figure 5:
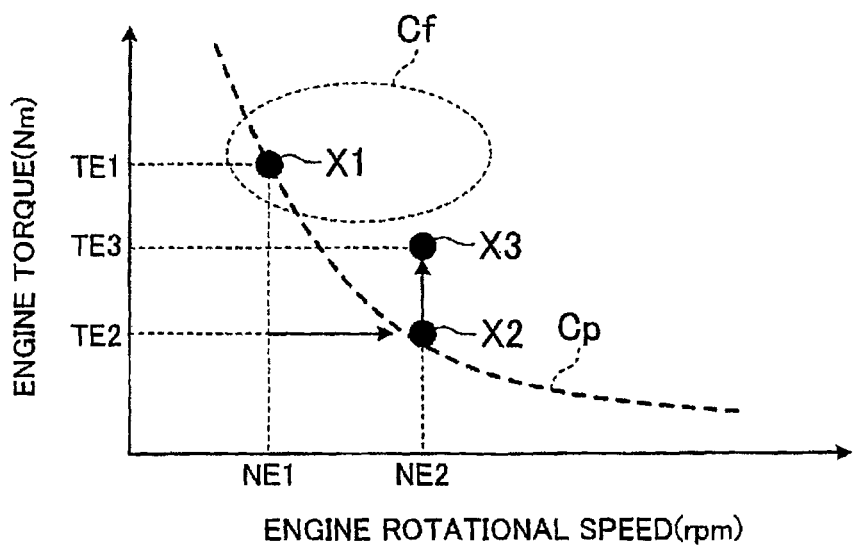
FIG. 5 is an explanatory view of a determination method of an operating point according to a second embodiment.
Figure 6:
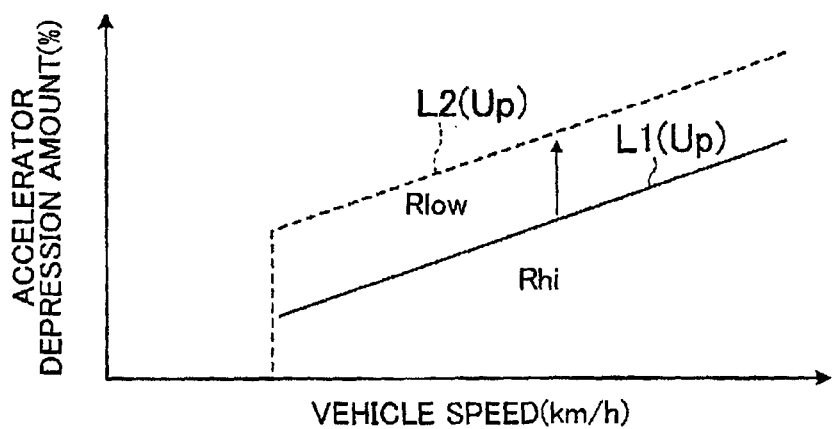
FIG. 6 is an explanatory view of offsetting of a gear shift line according to the second embodiment.
Figure 7:
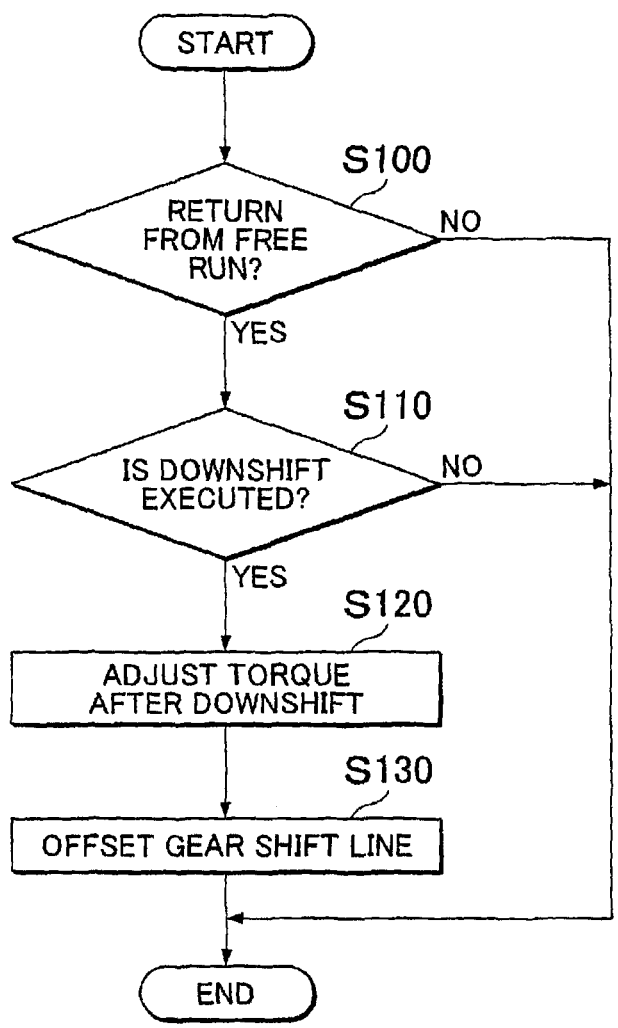
FIG. 7 is a flowchart showing the operation of a vehicle control device according to the second embodiment.

With reference to FIGS. 5 to 7, a second embodiment will be described. In the second embodiment, components having the same functions as those described in the first embodiment are designated by the same reference numerals and the repeated description thereof will be omitted. FIG. 5 is an explanatory view of a determination method of the operating point according to the second embodiment, FIG. 6 is an explanatory view of offsetting of a gear shift line according to the second embodiment, and FIG. 7 is a flowchart showing the operation of a vehicle control device according to the second embodiment. The second embodiment is different from the first embodiment in that the operating point after the downshift is adjusted such that an uncomfortable feeling given to a driver is reduced.

As in the first embodiment described above, in the case where the downshift control of the automatic transmission 6 performed at the time of the return from the predetermined control (hereinafter simply referred to as "downshift at return") is executed, as will be described hereinbelow with reference to FIG. 5, there is a possibility that the driver feels uncomfortable due to the change of a driving force. The control section 50 determines a target operating point of the engine 1 with reference to, e.g., a map shown in FIG. 5. In FIG. 5, the horizontal axis indicates the engine rotational speed NE, and the vertical axis indicates an output torque of the engine (hereinafter referred to as an "engine torque TE"). The operating point of the engine 1 is a point on the map determined by the combination of the engine rotational speed NE and the engine torque TE.

The operating point indicated by a reference mark X1 is the operating point before the downshift at return (hereinafter referred to as a "pre-gear shift operating point X1"). The value of the engine rotational speed NE at the pre-gear shift operating point X1 is NE1, and the value of the engine torque TE thereat is TE1. An engine rotational speed NE2 used as the target after the downshift at return is determined by the target gear position of the downshift at return. Herein, in the case where the output power of the engine 1 before the downshift is made equal to that after the downshift, the operating point after the downshift can be determined based on a constant-power line Cp. The constant-power line Cp is a curve obtained by joining the operating points having the same output power of the engine 1. In the case where the downshift is performed without changing the output power of the engine 1, the operating point used as the target after the downshift (hereinafter referred to as a "constant-power operating point") corresponds to the operating point indicated by a reference mark X2.

The constant-power operating point X2 is a point on the constant-power line Cp passing through the pre-gear shift operating point X1 at which the engine rotational speed NE is equal to the engine rotational speed NE2 corresponding to the gear position after the downshift. In the case where the constant-power operating point X2 is set as the target operating point and the downshift is executed, although the power of the engine 1 is not changed, the driving force after the gear shift is different from the driving force at the pre-gear shift operating point X1. Consequently, in the operation state having the same vehicle speed and the same accelerator depression amount, the generated driving force in the case where the downshift at return is performed is different from the generated driving force in the case where the downshift at return is not performed. There is a possibility that the driver feels uncomfortable due to the difference in driving force. For example, the case where the vehicle is caused to return from the predetermined control shortly after the start of the predetermined control will be described. In this case, it is considered that the driver feels uncomfortable due to the generation of different driving forces before the start of the predetermined control and after the return from the predetermined control in spite of the same accelerator depression amount.

In addition, in the case where the downshift at return is executed, there is a possibility that fuel efficiency is deteriorated. FIG. 5 shows a constant-efficiency line Cf. The constant-efficiency line Cf is a line obtained by joining the operating points having the same fuel efficiency of the engine 1. The constant-efficiency line Cf shown in FIG. 5 is a closed curve, and is, e.g., substantially oval. The fuel efficiency of the engine 1 is improved with approach to the center of the constant-efficiency line Cf. The fuel efficiency of the engine 1 is deteriorated with distance from the center of the constant-efficiency line Cf. The pre-gear shift operating point X1 is selected as the operating point having excellent fuel efficiency corresponding to the traveling state of the vehicle 101, e.g., the operating point having the highest fuel efficiency. In the case where the downshift at return is performed from this traveling state, the constant-power operating point X2 is lower in fuel efficiency than the pre-gear shift operating point X1. That is, when the downshift at return is performed, the engine 1 is temporarily operated at the operating point having low efficiency.

In contrast to this, the vehicle control device 100 according to the present embodiment adjusts the target operating point after the downshift so as to achieve at least one of suppression of the uncomfortable feeling given to the driver and suppression of the deterioration of the fuel efficiency. Specifically, the vehicle control device 100 according to the present embodiment sets an operating point (hereinafter referred to as an "adjusted operating point") X3 obtained by adding the torque to the constant-power operating point X2 as the target operating point. The adjusted operating point X3 is the operating point that has the value of the engine rotational speed NE equal to that of the constant-power operating point X2, and has the engine torque TE higher than that of the constant-power operating point X2. That is, the control section 50 of the present embodiment sets, as the operating point after the downshift (the adjusted operating point X3), the operating point higher in torque than an operating point on the constant-power line (the constant-power line Cp passing through the pre-gear shift operating point X1) determined from the operating point of the engine 1 before the downshift (the pre-gear shift operating point X1).

The adjusted operating point X3 is the operating point higher in torque than the constant-power operating point X2. Consequently, a difference between the driving force generated at the pre-gear shift operating point X1 and the driving force generated at the adjusted operating point X3 is smaller than a difference between the driving force generated at the pre-gear shift operating point X1 and the driving force generated at the constant-power operating point X2. Accordingly, it becomes possible to suppress the uncomfortable feeling given to the driver due to the change of the driving force.

In addition, the adjusted operating point X3 is the operating point having high efficiency closer to the constant-efficiency line Cf than the constant-power operating point X2. Consequently, in the case where the adjusted operating point X3 is set as the target operating point, the deterioration of the fuel efficiency is suppressed as compared with the case where the constant-power operating point X2 is set as the target operating point. Thus, according to the present embodiment, it is possible to execute the downshift at return while suppressing the uncomfortable feeling given to the driver and the deterioration of the fuel efficiency.

Note that the control section 50 may downshift the automatic transmission 6 with the adjusted operating point X3 set as the target operating point in a state in which the vehicle travels at the pre-gear shift operating point X1. Instead of this, the control section 50 may change the operating point to the adjusted operating point X3 after downshifting the automatic transmission 6 with the constant-power operating point X2 set as the target operating point. As shown in FIG. 5, in the case where the value TE3 of the engine torque TE at the adjusted operating point X3 is smaller than the value TE1 of the engine torque TE at the pre-gear shift operating point X1, control for suppressing the engine torque TE is performed. Examples of the control for suppressing the engine torque TE include control for retarding the ignition timing and control for reducing the opening of the throttle valve.

Next, offsetting of the gear shift line performed by the vehicle control device 100 according to the present embodiment will be described. In the downshift at return, the gear position is shifted to the gear position on a lower speed side than the gear position determined from the gear shift line such that the engagement shock of the clutch 3 is prevented. Consequently, it is preferable to early upshift the automatic transmission 6 to the gear position corresponding to the traveling state after the clutch 3 is engaged and the vehicle is caused to return from the predetermined control. With the above adjustment of the operating point, the deterioration of the fuel efficiency resulting from the downshift at return is suppressed. However, there is a high possibility that the original gear position corresponding to the traveling state can cause the engine 1 to operate at higher efficiency. In addition, with the above adjustment of the operating point, the uncomfortable feeling caused by the change of the driving force can be suppressed. However, there is a high possibility that the original gear position corresponding to the traveling state can generate the driving force closer to the request of the driver.

When the vehicle control device 100 according to the present embodiment executes the downshift at return, as will be described with reference to FIG. 6, the vehicle control device 100 then offsets the gear shift line. With this, it becomes possible to perform early transition to the original gear position corresponding to the traveling state. In FIG. 6, the horizontal axis indicates the vehicle speed [km/h], and the vertical axis indicates the accelerator depression amount [%]. The control section 50 pre-stores a gear shift line map in which the target gear position is determined based on the vehicle speed and the accelerator depression amount. FIG. 6 shows a part of the map.

In FIG. 6, a basic gear shift line L1 is the original gear shift line stored in the control section 50. A predetermined gear shift line L2 is the gear shift line that is temporarily used instead of the basic gear shift line L1 after the downshift in the downshift at return. The control section 50 performs gear shift determination based on the basic gear shift line L1 except after the execution of the downshift at return. The basic gear shift line L1 shown in FIG. 6 is, e.g., the gear shift line for determining the upshift. A region Rhi on a small accelerator depression amount side of the basic gear shift line L1 is a region in which the gear position on a relatively high speed side is selected. On the other hand, a region Rlow on a large accelerator depression amount side of the basic gear shift line L1 is a region in which the gear position on a relatively low speed side is selected. For example, in the case where the basic gear shift line L1 is related to the gear shift determination between the third gear position and the fourth gear position, the fourth gear position is selected in the region Rhi on the small accelerator depression amount side, and the third gear position is selected in the region Rlow on the large accelerator depression amount side.

When the control section 50 of the present embodiment executes the downshift at return, the control section 50 then determines the target gear position based on the predetermined gear shift line L2 instead of the basic gear shift line L1. That is, after the execution of the downshift at return, the control section 50 determines whether the upshift is executed based on the gear shift line (the predetermined gear shift line L2), and the gear shift line is offset such that accelerator depression amount of the gear shift line after the downshift is executed becomes larger than accelerator depression amount of a gear shift line (the basic gear shift line L1) before the downshift is executed. The predetermined gear shift line L2 is provided on the large accelerator depression amount side of the basic gear shift line L1. The predetermined gear shift line L2 of the present embodiment is the line that is in parallel with the basic gear shift line L1, and is obtained by offsetting the basic gear shift line L1 to the large accelerator depression amount side by a specific distance. According to the predetermined gear shift line L2, the region Rhi on the small accelerator depression amount side is expanded, and the gear position on the high speed side becomes likely to be selected.

That is, according to the predetermined gear shift line L2, the upshift determination is performed based on the large accelerator depression amount and the low vehicle speed as compared with the case where the target gear position is determined using the basic gear shift line L1. Consequently, according to the vehicle control device 100 of the present embodiment, the transition to the original gear position is performed early after the execution of the downshift at return. After the upshift is executed based on the predetermined gear shift line L2, the control section 50 determines the target gear position based on the basic gear shift line L1 instead of the predetermined gear shift line L2.

Note that the gear shift line that is offset after the execution of the downshift at return may include all of gear shift lines or a part thereof. For example, the control section 50 may offset only the gear shift line that is directly related to the gear positions before and after the gear shift in the downshift at return. Specifically, in the case where the gear position is downshifted from the fourth gear position to the third gear position by the downshift at return, only the gear shift line related to the upshift from the third gear position to the fourth gear position may be offset. In addition, in the case where the gear position is downshifted from the fourth gear position to the second gear position by the downshift at return, the gear shift line related to the upshift from the second gear position to the third gear position, and the gear shift line related to the upshift from the third gear position to the fourth gear position may be offset.

With reference to FIG. 7, the operation of the vehicle control device 100 of the present embodiment will be described. The control flow shown in FIG. 7 is repeatedly executed at predetermined intervals, for example, after the start of the predetermined control.

In step S100, the control section 50 determines whether or not the return request from the free run is generated. As the result of the determination, in the case where it is determined that the return request from the free run is generated (step S100-Y), the control flow proceeds to step S110 and, in the case where it is determined that the return request therefrom is not generated (step S100-N), the present control flow is ended.

In step S110, the control section 50 determines whether or not the downshift at return is executed. For example, similarly to step S20 in the first embodiment (FIG. 1) described above, the control section 50 determines whether or not the downshift at return is executed. As the result of the determination in step S110, in the case where it is determined that the downshift at return is executed (step S110-Y), the control flow proceeds to step S120 and, in the case where it is determined that the downshift at return is not executed (step S110-N), the present control flow is ended. In this case, the control section 50 performs the restart of the engine 1 and the engagement of the clutch 3 to thereby cause the vehicle 101 to return from the predetermined control without executing the downshift at return.

In step S120, the control section 50 adjusts the torque after the downshift. For example, similarly to step S30 of the first embodiment (FIG. 1) described above, the control section 50 determines the target gear position. When the target gear position is determined, as described with reference to FIG. 5, the control section 50 adjusts the engine torque TE after the downshift at return. That is, the control section 50 determines the adjusted operating point X3 by adding the torque to the value TE2 of the engine torque TE of the constant-power operating point X2. The control section 50 determines the adjusted operating point X3 as the target operating point after the downshift. That is, the control section 50 makes the powers before and after the gear shift equal to each other by reducing the generated torque by a torque corresponding to an increase in the gear ratio of the gear position after the gear shift relative to the gear position before the gear shift (calculating the constant-power operating point X2), and calculates the adjusted operating point X3 by adding the torque that does not generate an acceleration uncomfortable feeling.

The control section 50 instructs the engine 1 and the automatic transmission 6 to execute the downshift at return with the adjusted operating point X3 used as the target operating point. In addition, similarly to steps S50 to S70 in the first embodiment (FIG. 1) described above, the control section 50 starts the engagement of the clutch 3 after the complete explosion of the engine 1, and executes the sweep-up control when the change of the turbine rotational speed NT becomes equal to or less than the predetermined value. Note that these operations, i.e., the engagement of the clutch 3, the confirmation of the complete explosion, and the sweep-up control may be executed concurrently with the next step S130. When step S120 is executed, the control flow then proceeds to step S130.

In step S130, the control section 50 offsets the gear shift line. As described with reference to FIG. 6, the control section 50 changes the gear shift line for determining the target gear position from the basic gear shift line L1 to the predetermined gear shift line L2 by offsetting. When step S130 is executed, the present control flow is ended.

A first modification of each of the first embodiment and the second embodiment will be described. The stepped automatic transmission is used as the automatic transmission 6 in each embodiment described above, a continuously variable transmission capable of gear shift steplessly may also be used as the automatic transmission 6 instead of the stepped automatic transmission. In this case, in step S30 in FIG. 1 and the like, it is preferable to determine the target speed ratio instead of the target gear position of the downshift at return. The control section 50 selects the speed ratio at which the input rotational speed Nin after the downshift exceeds the predetermined rotational speed NTFRNMAX as the target speed ratio of the continuously variable automatic transmission 6.

In addition, a continuously variable transmission mechanism that electrically controls the speed ratio by using a differential mechanism, a dynamo-electric machine or the like may also be used as the automatic transmission 6. The method of determining the target speed ratio in this case may be the method used in the case of the continuously variable transmission.

A second modification of each of the first embodiment and the second embodiment will be described. The predetermined rotational speed NTFRNMAX in each embodiment described above is the maximum value of the turbine rotational speed NT when the engine rotational speed NE increases at the time of start of the engine 1. The predetermined rotational speed NTFRNMAX is not limited thereto. The predetermined rotational speed NTFRNMAX may be determined based on the maximum value of the turbine rotational speed NT. The predetermined rotational speed NTFRNMAX may not be the maximum value thereof, and may be a value smaller or larger than the maximum value.

A third modification of each of the first embodiment and the second embodiment will be described. In each embodiment described above, the torque converter 2 is provided between the clutch 3 and the engine 1. The torque converter 2 may be omitted. In the case where the engine 1 and the first engagement element 3a of the clutch 3 are connected to each other without the intervention of the torque converter 2, the predetermined rotational speed NTFRNMAX is preferably determined based on the maximum value of the engine rotational speed NE when the engine rotational speed NE increases at the time of start of the engine 1. For example, the predetermined rotational speed NTFRNMAX may be the maximum value of the engine rotational speed NE when the engine rotational speed NE increases.

Instead of the disposition of the clutch 3 in each embodiment described above, the clutch 3 may also be disposed between the torque converter 2 and the engine 1. In this case, similarly to the case where the torque converter 2 is omitted, the predetermined rotational speed NTFRNMAX is preferably determined based on the maximum value of the engine rotational speed NE when the engine rotational speed NE increases at the time of start of the engine 1. For example, the predetermined rotational speed NTFRNMAX may be the maximum value of the engine rotational speed NE when the engine rotational speed NE increases. Note that, in the case where the torque converter 2 is present between the clutch 3 and the automatic transmission 6, a difference between the rotational speed of the input shaft 5 of the automatic transmission 6 and the rotational speed of the second engagement element 3b of the clutch 3 is generated. The control section 50 preferably determines the target gear position in the downshift at return in consideration of the difference.

A fourth modification of each of the first embodiment and the second embodiment will be described. The downshift at return may be executed only in the case where the vehicle speed is equal to or higher than a predetermined vehicle speed. For example, in the case where the input rotational speed Nin when the return request from the predetermined control is made is extremely low, when the clutch 3 is engaged during the increase of the engine rotational speed NE, there is a possibility that a thermal load to the clutch 3 becomes excessively large. In addition, in the case where the input rotational speed Nin is extremely low, there are cases where it is not possible to increase the input rotational speed Nin to a rotational speed higher than the predetermined rotational speed NTFRNMAX by the downshift at return, and the downshift at return is not realistic from the viewpoint of the deterioration of the fuel efficiency and the change of the driving force.

As the countermeasures, when the vehicle speed is lower than the predetermined vehicle speed, it is considered that the clutch 3 is engaged after the engine rotational speed NE or the turbine rotational speed NT starts to decrease after reaching the maximum value at the time of start of the engine. In such a vehicle, the downshift at return may be executed only in the case where the vehicle speed is equal to or higher than the predetermined vehicle speed.

The contents disclosed in the individual embodiments and the individual modifications can be executed by being appropriately combined with each other.

The invention claimed is:

1. A control device for a vehicle, the vehicle including: an engine, an automatic transmission, and a clutch disposed between the engine and the automatic transmission, the clutch including a first engagement element connected to the engine and a second engagement element connected to the automatic transmission, the control device comprising:
an electronic control unit configured to
(i) when a predetermined condition is satisfied, execute predetermined control in which the engine is stopped, the clutch is disengaged, and the vehicle is caused to travel,
(ii) restart the engine before engaging the clutch, when the predetermined condition is not satisfied during execution of the predetermined control, and
(iii) execute a downshift of the automatic transmission such that a rotational speed of the second engagement element becomes equal to or higher than a predetermined rotational speed when the predetermined condition is not satisfied during the execution of the predetermined control and the rotational speed of the second engagement element is lower than the redetermined rotational speed, and then engage the clutch, wherein
the predetermined rotational speed is a maximum value of a rotational speed of the first engagement element when a rotational speed of the engine increases at the time of start of the engine.

2. A control device for a vehicle, the vehicle including: an engine, an automatic transmission, and a clutch disposed between the engine and the automatic transmission, the clutch including a first engagement element connected to the engine and a second engagement element connected to the automatic transmission, the control device comprising:
an electronic control unit configured to
(i) when a predetermined condition is satisfied, execute predetermined control in which the engine is stopped, the clutch is disengaged, and the vehicle is caused to travel,
(ii) restart the engine before engaging the clutch, when the predetermined condition is not satisfied during execution of the predetermined control, and
(iii) execute a downshift of the automatic transmission such that a rotational speed of the second engagement element becomes equal to or higher than a predetermined rotational speed when the predetermined condition is not satisfied during the execution of the predetermined control and the rotational speed of the second engagement element is lower than the redetermined rotational speed, and then engage the clutch, wherein the electronic control unit is configured to set, as an operating point of the engine after the downshift is executed, an operating point higher in torque than an operating point on a constant-power line determined from an operating point of the engine before the downshift is executed.

3. A control device for a vehicle, the vehicle including: an engine, an automatic transmission, and a clutch disposed between the engine and the automatic transmission, the clutch including a first engagement element connected to the engine and a second engagement element connected to the automatic transmission, the control device comprising:

an electronic control unit configured to (i) when a predetermined condition is satisfied, execute predetermined control in which the engine is stopped, the clutch is disengaged, and the vehicle is caused to travel, (ii) restart the engine before engaging the clutch, when the predetermined condition is not satisfied during execution of the predetermined control, and (iii) execute a downshift of the automatic transmission such that a rotational speed of the second engagement element becomes equal to or higher than a predetermined rotational speed when the predetermined condition is not satisfied during the execution of the predetermined control and the rotational speed of the second engagement element is lower than the predetermined rotational speed, and then engage the clutch, wherein the electronic control unit is configured to determine whether an upshift is executed based on a gear shift line after the downshift is executed, and the gear shift line is offset such that an accelerator depression amount of the gear shift line after the downshift is executed becomes larger than an accelerator depression amount of a gear shift line before the downshift is executed.

4. The control device according to claim 1, wherein the electronic control unit is configured to engage the clutch after the rotational speed of the engine or the rotational speed of the first engagement element starts to decrease after reaching the maximum value at the time of start of the engine when a vehicle speed is lower than the predetermined vehicle speed.

5. The control device according to claim 1, wherein the electronic control unit is configured to set, as an operating point of the engine after the downshift is executed, an operating point higher in torque than an operating point on a constant-power line determined from an operating point of the engine before the downshift is executed.

6. The control device according to claim 1, wherein the electronic control unit is configured to determine whether an upshift is executed based on a gear shift line after the downshift is executed, and the gear shift line is offset such that an accelerator depression amount of the gear shift line after the downshift is executed becomes larger than an accelerator depression amount of a gear shift line before the downshift is executed.

7. The control device according to claim 2, wherein the electronic control unit is configured to determine whether an upshift is executed based on a gear shift line after the downshift is executed, and the gear shift line is offset such that an accelerator depression amount of the gear shift line after the downshift is executed becomes larger than an accelerator depression amount of a gear shift line before the downshift is executed.

* * * * *